United States Patent
Yu et al.

(10) Patent No.: US 9,603,035 B2
(45) Date of Patent: Mar. 21, 2017

(54) METHOD AND NODE RELATED TO CHANNEL ESTIMATION

(75) Inventors: LuSheng Yu, Täby (SE); Bo Göransson, Sollentuna (SE); Jinliang Huang, Sundbyberg (SE); Yu Yang, Solna (SE)

(73) Assignee: TELEFONAKTIEBOLAGET L M ERICSSON, Stockholm (SE)

(*) Notice: Subject to any disclaimer, the term of this patent is extended or adjusted under 35 U.S.C. 154(b) by 359 days.

(21) Appl. No.: 14/350,920

(22) PCT Filed: Oct. 13, 2011

(86) PCT No.: PCT/SE2011/051225
§ 371 (c)(1),
(2), (4) Date: Apr. 10, 2014

(87) PCT Pub. No.: WO2013/055268
PCT Pub. Date: Apr. 18, 2013

(65) Prior Publication Data
US 2014/0247747 A1  Sep. 4, 2014

(51) Int. Cl.
*H04W 24/02* (2009.01)
*H04J 11/00* (2006.01)
(Continued)

(52) U.S. Cl.
CPC ........... *H04W 24/02* (2013.01); *H04J 11/005* (2013.01); *H04L 25/0202* (2013.01); *H04L 25/0208* (2013.01); *H04L 27/2647* (2013.01)

(58) Field of Classification Search
CPC .................................................. H04L 25/0202
See application file for complete search history.

(56) References Cited

U.S. PATENT DOCUMENTS

2004/0131007 A1  7/2004  Smee et al.
2007/0008873 A1  1/2007  Stopler
(Continued)

FOREIGN PATENT DOCUMENTS

EP  0 738 062 A2  10/1996
WO  2007012538 A1  2/2007
(Continued)

OTHER PUBLICATIONS

Extended European Search Report dated Jul. 17, 2015 for European Application No. 1 187 4044.8-1866 (2 777 185) corresponding to PCT/SE2011/051225, International Filing Date: Oct. 13, 2011, consisting of 6-pages.
(Continued)

*Primary Examiner* — Robert M Morlan
*Assistant Examiner* — Nourali Mansoury
(74) *Attorney, Agent, or Firm* — Patents on Demand, P.A.; Brian K. Buchheit; Scott M. Garrett (57) ABSTRACT

A method comprises determining a first and a second sub-carrier associated with a channel, and multiplying a signal received on the first sub-carrier with a first number to form a first resulting signal. The first number multiplied with a known signal transmitted by a second transmitting node on the first sub-carrier equals a constant value. A signal received on the second sub-carrier is multiplied with a second number to form a second resulting signal. The second number multiplied with the known signal transmitted by the second transmitting node on the second sub-carrier equals the constant value. The second resulting signal is subtracted from the first resulting signal to obtain a signal for which interference from the second transmitting node is suppressed, and the channel is estimated based on the obtained signal.

16 Claims, 3 Drawing Sheets

(51) Int. Cl.
*H04L 25/02* (2006.01)
*H04L 27/26* (2006.01)

(56) References Cited

U.S. PATENT DOCUMENTS

| | | | |
|---|---|---|---|
| 2007/0242782 A1* | 10/2007 | Han | H04B 1/7105 375/343 |
| 2008/0298524 A1 | 12/2008 | Koorapaty et al. | |
| 2010/0304751 A1* | 12/2010 | Ji | H04L 1/02 455/450 |
| 2011/0194430 A1* | 8/2011 | Yoo | H04L 25/0224 370/252 |
| 2014/0119276 A1* | 5/2014 | Boudreau | H04W 4/00 370/328 |
| 2014/0269246 A1* | 9/2014 | Yoo | H04J 3/10 370/201 |

FOREIGN PATENT DOCUMENTS

| | | |
|---|---|---|
| WO | 2008145337 A2 | 12/2008 |
| WO | 2009099810 A2 | 8/2009 |
| WO | 2010109540 A1 | 9/2010 |

OTHER PUBLICATIONS

International Search Report and Written Opinion dated Jul. 31, 2012 for International Application No. PCT/SE2011/051225, International Filing Date: Oct. 13, 2011 consisting of 19-pages.

* cited by examiner

METHOD AND NODE RELATED TO CHANNEL ESTIMATION

TECHNICAL FIELD

The disclosure generally relates to channel estimation. In particular the disclosure relates to a receiving node and a method for use in a receiving node of a communications system applying frequency division multiplexing, for estimating a channel between the receiving node and a first transmitting node.

BACKGROUND

Figure 1:
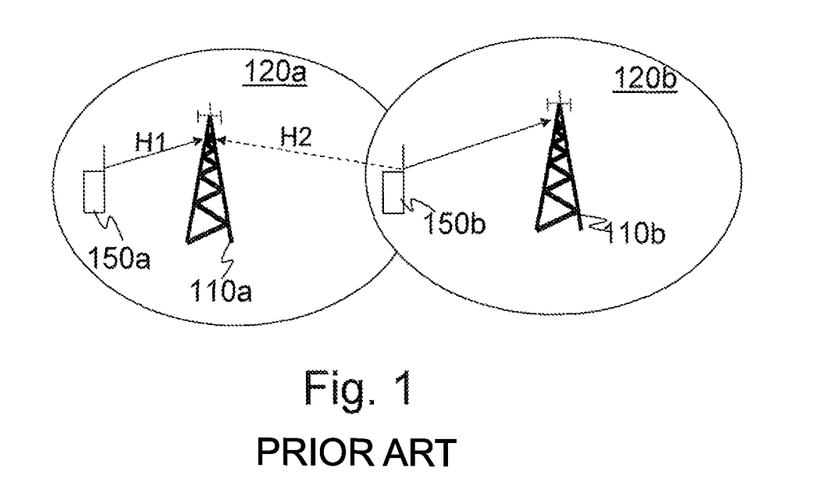
FIG. 1 is a schematic illustration of a conventional wireless communications system.

The Universal Mobile Telecommunication System (UMTS) is one of the third generation mobile communication technologies designed to succeed the Global System for Mobile communications (GSM). Long Term Evolution (LTE) is a project within the $3^{rd}$ Generation Partnership Project (3GPP) to improve the UMTS standard to cope with future requirements in terms of improved services such as higher data rates, improved efficiency, and lowered costs. The Universal Terrestrial Radio Access Network (UTRAN) is the radio access network of a UMTS and Evolved UTRAN (E-UTRAN) is the radio access network of an LTE system. In an E-UTRAN, a wireless device such as a User Equipment (UE) 150a is wirelessly connected to a base station (BS) 110a commonly referred to as an evolved NodeB (eNodeB), as illustrated in FIG. 1. Each eNodeB 110a-b serves a certain area which may be referred to as a cell 120a-b.

In a wireless communication system using a frequency divisional multiplexing technology such as the Orthogonal Frequency Division Multiplexing (OFDM) technology, the entire channel is divided into many narrow sub-channels, which are transmitted in parallel. The OFDM technique transforms a frequency selective wide-band channel into a group of non-selective narrowband channels, making the channel robust against large delay spread by preserving the orthogonality in the frequency domain. The primary advantage of OFDM over single-carrier schemes is its ability to cope with severe channel conditions without complex equalization filters in the receiver. Channel equalization is simplified because OFDM may be viewed as using many slowly-modulated narrowband signals rather than one rapidly-modulated wideband signal. The low symbol rate makes the use of a guard interval between symbols affordable, making it possible to handle time-spreading and eliminate inter-symbol interference.

In an LTE system the OFDM-based technology is adopted as a mean to achieve high transmission capability and robustness to multi-path delay. Orthogonal Frequency-Division Multiple Access (OFDMA) is used in the downlink, and Single-carrier frequency-division multiple access (SC-FDMA) is used in the uplink. OFDMA is a multi-user version of OFDM, where multiple access is achieved by assigning subsets of sub-carriers to individual users. SC-FDMA is a linearly pre-coded OFDMA scheme. The distinguishing feature of SC-FDMA is that it leads to a single-carrier transmit signal, in contrast to OFDMA which is a multi-carrier transmission scheme.

Channel estimation has been widely used to improve the performance of OFDM systems, and is crucial for e.g. coherent demodulation which assumes channel knowledge at the receiver. It is also used in multi antenna systems to increase the throughput or coverage using transmission or receive schemes that require channel knowledge at the transmitter and/or receiver. Pilot based channel estimation schemes are commonly used. In such a scheme known reference symbols—also called pilot symbols—are inserted at regular intervals in the time-frequency grid. Using the knowledge of the pilot symbols, the receiver can estimate the frequency domain channel around the location of the pilot symbol. The channel's frequency response across the whole bandwidth can thus be determined by interpolation using various channel estimation schemes, such as Least Square (LS), Linear Minimum Mean Square Error (LMMSE), Discrete Fourier Transform (DFT), or Discrete Cosine Transform (DCT) based estimation. Channel estimation is affected by the channel conditions such as Signal to Noise Ratio (SNR), mobile velocity and multi-path delay spread.

There is therefore a need to improve channel estimation in communications system applying frequency division multiplexing.

SUMMARY

FIG. 1 illustrates a multi-cell scenario in the radio network of an advanced LTE system with an inter-cell interference situation. Such a situation may e.g. occur in a Heterogenous network (Hetnet) or in a network applying Coordinated Multi-Point (CoMP) transmissions. A first UE 150a is served by a first eNodeB 110a in a cell 120a, and a second UE 150b is served by a second eNodeB 110b in a neighboring cell 120b. The two UEs 150a-b are transmitting simultaneously on the same Physical Resource Blocks (PRB), and the second UE's 150b transmission is thus interfering with the first UE's 150a transmission at the first eNodeB 110a. PRBs allocated for the second UE may thus collide with the first UE's PRBs. In a worst case, the PRBs allocated for the first UE 150a would be completely overlapping with the second UE's PRBs. When the first UE 150a is far away from the first eNodeB 110a and the received power of the second UE 150b is comparable to that of the first UE 150a, strong interference may be observed in the first eNodeB 110a. This situation may degrade the performance of the entire receiver chain in the first eNodeB 110a.

In existing channel estimation methods intra-cell interferences may be suppressed by using cyclic shifted Zadoff-Chu sequences. However, inter-cell interference is not considered in conventional channel estimation methods. Instead, the inter-cell interference is treated as noise, which is subsequently suppressed in DCT or DFT-based channel estimation methods. Strong inter-cell interference, as in the scenario described above with reference to FIG. 1, will therefore affect the accuracy of the channel estimation.

It is therefore an object to address some of the problems outlined above, and to provide an improved channel estimation in cases of strong inter-cell interference in a received signal. This object and others are achieved by the method and the receiving node according to the independent claims, and by the embodiments according to the dependent claims.

In accordance with one embodiment, a method for use in a receiving node of a communications system applying frequency division multiplexing, for estimating a channel between the receiving node and a first transmitting node is provided. The method comprises determining a first and a second sub-carrier associated with the channel, and multiplying a signal received on the first sub-carrier with a first number to form a first resulting signal. The first number multiplied with a known signal transmitted by a second transmitting node on the first sub-carrier equals to a constant value. The method further comprises multiplying a signal received on the second sub-carrier with a second number to form a second resulting signal. The second number multiplied with the known signal transmitted by the second transmitting node on the second sub-carrier equals to the constant value. The method also comprises subtracting the second resulting signal from the first resulting signal to obtain a signal for which an interference from the second transmitting node is suppressed, and estimating the channel based on the obtained signal.

In accordance with another embodiment, a receiving node for use in a communications system applying frequency division multiplexing is provided. The receiving node is configured to estimate a channel between the receiving node and a first transmitting node. The receiving node comprises a processing unit, and a receiver. The processing unit is configured to determine a first and a second sub-carrier associated with the channel. The receiver is configured to receive a signal on the first sub-carrier. The processing unit is further configured to multiply the received signal on the first sub-carrier with a first number to form a first resulting signal, wherein the first number multiplied with the known signal transmitted by the second transmitting node on the first sub-carrier equals to a constant value. The receiver is further configured to receive a signal on the second sub-carrier. The processing unit is further configured to multiply the received signal on the second sub-carrier with a second number to form a second resulting signal, wherein the second number multiplied with the known signal transmitted by the second transmitting node on the second sub-carrier equals to the constant value. The processing unit is further configured to subtract the second resulting signal from the first resulting signal to obtain a signal for which an interference from the second transmitting node is suppressed, and to estimate the channel based on the obtained signal.

An advantage of embodiments is that the accuracy of the channel estimation may be improved compared to conventional channel estimation when inter-cell interference is strong.

Another advantage of embodiments is the flexibility in regards to the choice of channel estimation method, as the proposed method may be combined with any type of channel estimation.

Other objects, advantages and features of embodiments will be explained in the following detailed description when considered in conjunction with the accompanying drawings and claims.

DETAILED DESCRIPTION

In the following, different aspects will be described in more detail with references to certain embodiments and to accompanying drawings. For purposes of explanation and not limitation, specific details are set forth, such as particular scenarios and techniques, in order to provide a thorough understanding of the different embodiments. However, other embodiments that depart from these specific details may also exist.

Moreover, those skilled in the art will appreciate that the functions and means explained herein below may be implemented using software functioning in conjunction with a programmed microprocessor or general purpose computer, and/or using an application specific integrated circuit (ASIC). It will also be appreciated that while the embodiments are primarily described in the form of a method and node, they may also be embodied in a computer program product as well as in a system comprising a computer processor and a memory coupled to the processor, wherein the memory is encoded with one or more programs that may perform the functions disclosed herein.

Embodiments are described in a non-limiting general context in relation to an example scenario in an advanced LTE network, such as the one illustrated in FIG. 1, where a first eNodeB 110a as the receiving node performs uplink channel estimation based on a reference signal from a first transmitting UE 150a in a served cell 120a. The first eNodeB 110a has information about a second UE 150b in a neighboring cell 120b served by a second eNodeB 110b, and specifically about the reference signal used by the UE 150b in the neighboring cell. However, it should be noted that the embodiments may also be applied to downlink channel estimation performed by a UE as the receiving node. The UE then needs to be aware of the reference signals transmitted by both the serving eNodeB and the interfering eNodeB.

Furthermore, embodiments may be applied to other types of radio access networks using frequency division multiplexing technology and using pilot signals for channel estimation, such as WiMAX (Worldwide Interoperability for Microwave Access). The reference signals used for E-UTRAN are based on a Zadoff-Chu sequence. However, any other type of reference signal or known signal may be used. Embodiments may also be applied to other types of receiving nodes such as relay nodes in the uplink case, or any wireless devices in the downlink case. In the example scenario, only one receiving antenna is assumed. However, the method is applicable also to the case when multiple receiving antennas are used.

The problem of improving channel estimation in cases of strong inter-cell interference is addressed by a method where the inter-cell interference is suppressed in a received signal. In a situation as the one described above with reference to FIG. 1, the first eNodeB 110a pre-processes the received signal to remove inter-cell interference from the second UE 150b. The interference-free signal may then be used with conventional channel estimation methods, such as MMSE, DCT/IFFT-based methods, to further suppress noise and estimate the channel H1 between the first eNodeB 110a and the first UE 150a. A pre-requisite for the method is that the reference signal of the interfering UE 150b is known to the first eNodeB 110a, as may e.g. be the situation in a Hetnet, or in a network applying CoMP transmissions. The method thus increases the accuracy of the channel estimation by canceling interferences between adjacent cells.

Figure 2A:
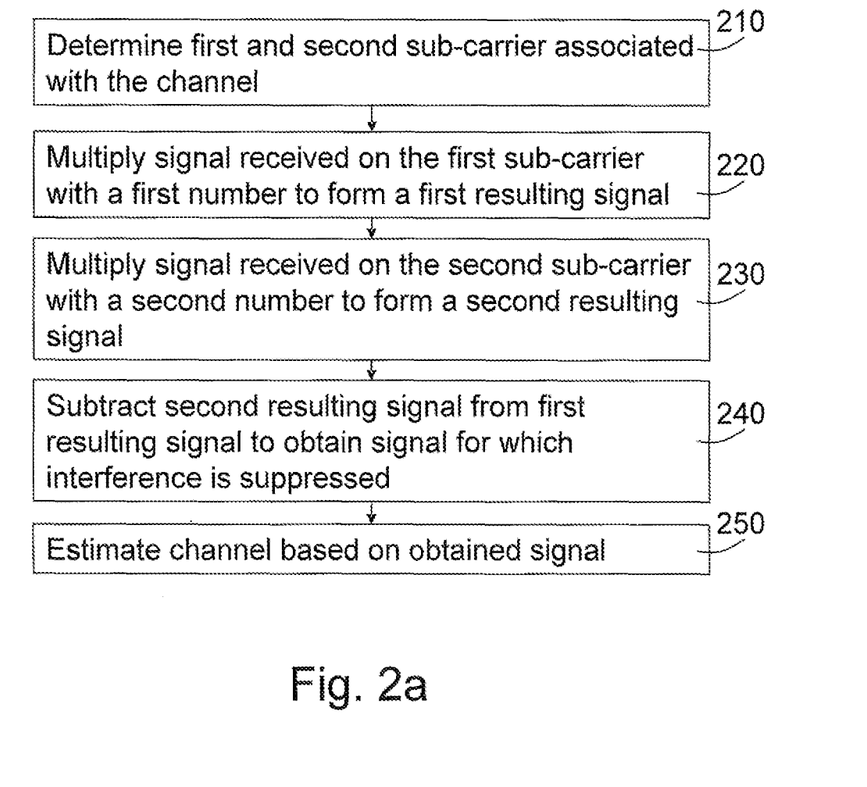
FIGS. 2a-2b are flowcharts illustrating the method in the receiving node according to embodiments.

FIG. 2a is a flowchart illustrating a method for use in a receiving node of a communications system applying frequency division multiplexing, for estimating a channel H1 between the receiving node and a first transmitting node, according to one embodiment. In the example scenario, the receiving node is the first eNodeB 110a, and the first transmitting node is the first UE 150a. In alternative embodiments the receiving node may be a base station of another type of radio access network, or a relay node, or it may be a UE or any wireless device. If the receiving node is a UE performing downlink channel estimation, the first transmitting node will consequently be a base station or a relay node.

It is understood that the receiving node has information regarding a known signal transmitted by a second transmitting node, which in the example scenario is the second UE 150b in the neighboring cell 120b. The method illustrated in FIG. 2a comprises:

210: Determining a first and a second sub-carrier associated with the channel.

220: Multiplying a signal received on the first sub-carrier with a first number to form a first resulting signal, wherein the first number multiplied with a known signal transmitted by a second transmitting node on the first sub-carrier equals to a constant value. The known signal may be a reference signal, or a pilot signal. In the example scenario, the reference signal transmitted by the second UE 150b is known not only to its serving eNodeB 110b, but also to the eNodeB 110a performing the channel estimation. According to a first embodiment, the first number is an inverse of the known signal transmitted by the second transmitting node on the first sub-carrier. The constant value is in this first embodiment equal to one. The multiplication is described as being done sub-carrier by sub-carrier. However, it may also be done for blocks of several sub-carriers when using a block-oriented processing, in which case the signal received on the block of sub-carriers is multiplied by a sequence of numbers.

230: Multiplying a signal received on the second sub-carrier with a second number to form a second resulting signal, wherein the second number multiplied with the known signal transmitted by the second transmitting node on the second sub-carrier equals to the constant value. According to the first embodiment, the second number is an inverse of the known signal transmitted by the second transmitting node on the second sub-carrier. This first embodiment is described with further details below.

240: Subtracting the second resulting signal from the first resulting signal to obtain a signal for which an interference from the second transmitting node is suppressed.

250: Estimating the channel based on the obtained signal. Any channel estimation method may be used to estimate the channel.

According to one embodiment, the channel is assumed to be constant over the first and second sub-carriers. The channel can be said to be constant over neighbouring sub-carriers when the correlation between the two sub-carriers is high enough. The correlation, i.e. equality, between any two sub-carriers may be estimated from the time dispersion of the channel. In an LTE Extended Typical Urban (ETU) channel model the maximum delay spread is 5 μs. This leads to a correlation factor of 0.9908 for adjacent sub-carriers, and a correlation factor of 0.9634 for sub-carriers spaced by one sub-carrier. Furthermore, the channel is interfered by the second transmitting node on the first and second sub-carriers in one embodiment. The interference suppression may thus be performed only on sub-carriers which are interfered.

The first embodiment is further described hereinafter, assuming the example scenario for uplink channel estimation described above with reference to FIG. 1. The receiving node is thus an eNodeB 150a in E-UTRAN. The received signal at a first sub-carrier i after OFDM demodulation is given by:

$$Y(i)=H_1(i)X_1(i)+H_2(i)X_2(i)+n \quad (1)$$

where $i=0, \ldots, N_{1,sc}-1$. $H_1$ is the channel associated with the first UE 150a and $X_1$ is the reference signal transmitted by the first UE 150a. $H_2$ is the channel and $X_2$ is the reference signal associated with the second UE 150b. n is the noise, and $N_{1,sc}$ is the total number of sub-carriers used by the first UE 150a that are interfered by the second UE 150b.

When estimating $H_1$, the contribution of the second UE 150b may be removed from the received signal for an improved channel estimation. As described above, in a first step 210 of the method, a first and a second sub-carrier is determined. The first and second sub-carriers may be sub-carriers on which the received signal is interfered by the second UE 150b, and for which the wireless channel is assumed to be constant. The aim is thus to find a second sub-carrier j which is interfered and which is close enough in frequency to the first sub-carrier i, such that it may be assumed that the channel is kept constant for sub-carriers i and j.

In E-UTRAN the inverse of the reference signal is equal to the complex conjugate of the reference signal. In step 220 described above, the received signal Y(i) on sub-carrier i is multiplied with a first number, which is the complex conjugate of the reference signal transmitted by the second UE 150b on the first sub-carrier i. The complex conjugate of the reference signal is denoted $\text{conj}(X_2(i))$. In step 230, the received signal Y(j) on sub-carrier j is multiplied with a second number, which analogously is the complex conjugate of the reference signal transmitted by the second UE 150b on the second sub-carrier j. The complex conjugate is denoted $\text{conj}(X_2(j))$.

The complex conjugate of the reference signal on a sub-carrier i multiplied with the reference signal equals to the constant value one for reference signals used in E-UTRAN:

$$\text{conj}(X_2(i))X_2(i)=1. \quad (2)$$

Therefore, the resulting signals obtained by the above mentioned multiplications are given by:

$$Y'(i)=\text{conj}(X_2(i))Y(i)=H_1(i)M(i)+H_2(i)+n'(i) \quad (3)$$

$$Y'(j)=\text{conj}(X_2(j))Y(j)=H_1(j)M(j)+H_2(j)+n'(j) \quad (4)$$

where $$M(i)=\text{conj}(X_2(i))X_1(i) \quad (5)$$

$$M(j)=\text{conj}(X_2(j))X_1(j) \quad (6)$$

With the assumption that the channel remains constant for the sub-carriers i and j, we have $$H_2(i)=H_2(j). \quad (7)$$

In step 240, we can thus subtract the second resulting signal Y'(j) in (4) from the first resulting signal Y'(i) in (3), and thereby cancel the interference from the second UE 150b. The obtained interference suppressed signal $Y_1(i)$ is thus given by:

$$Y_1(i)=Y'(i)-Y'(j)=H_1(i)(M(i)-M(j))+n'(i)-n'(j) \quad (8)$$

The obtained signal in (8) may then be used to estimate the channel in step 250. The signal (8) may be fed into a conventional channel estimator, in which typically a matched filter is performed according to the following:

$$\frac{\text{conj}((M(i)-M(j)))}{(M(i)-M(j))^2}Y_1(i). \quad (9)$$

No pre-coding at the transmitter side is needed, so the solution is backward compatible to old LTE releases. Another advantage is that the proposed method may be combined with other methods, such as iterative channel estimation.

With the proposed interference suppression, the noise power of the interference suppressed signal $Y_1(i)$ in (8) may get bigger for some choices of sub-carriers i and j. Therefore, in a second embodiment, a threshold $P_{thres}$ for how much the noise may be amplified is used to decide when to use the interference suppressed signal. A noise amplification factor $N_{ampl}$ may be determined as a ratio between a noise power of the interference suppressed signal and a noise power of the received signal. In the example scenario, the following expression may be used to determine the noise amplification factor:

$$N_{ampl} = \left(\frac{conj(X_2(i)) - conj(X_2(j))}{M(i) + M(j)}\right)^2. \quad (10)$$

If it is found that the noise amplification factor is larger than the threshold, i.e.:

$$N_{ampl} > P_{thres} \quad (11)$$

a conventional matched filtering for sub-carrier i may be performed instead of performing the channel estimation based on the interference suppressed signal for sub-carrier i. The advantage of the second embodiment is that the proposed interference suppression is only used for sub-carriers where it may be advantageous, which thus assures an overall improved channel estimation performance compared to conventional channel estimation methods. With a threshold $P_{thres}=1$, no noise amplification is allowed at all. However, a higher threshold may be used as other methods may be used to suppress the noise.

Figure 2B:
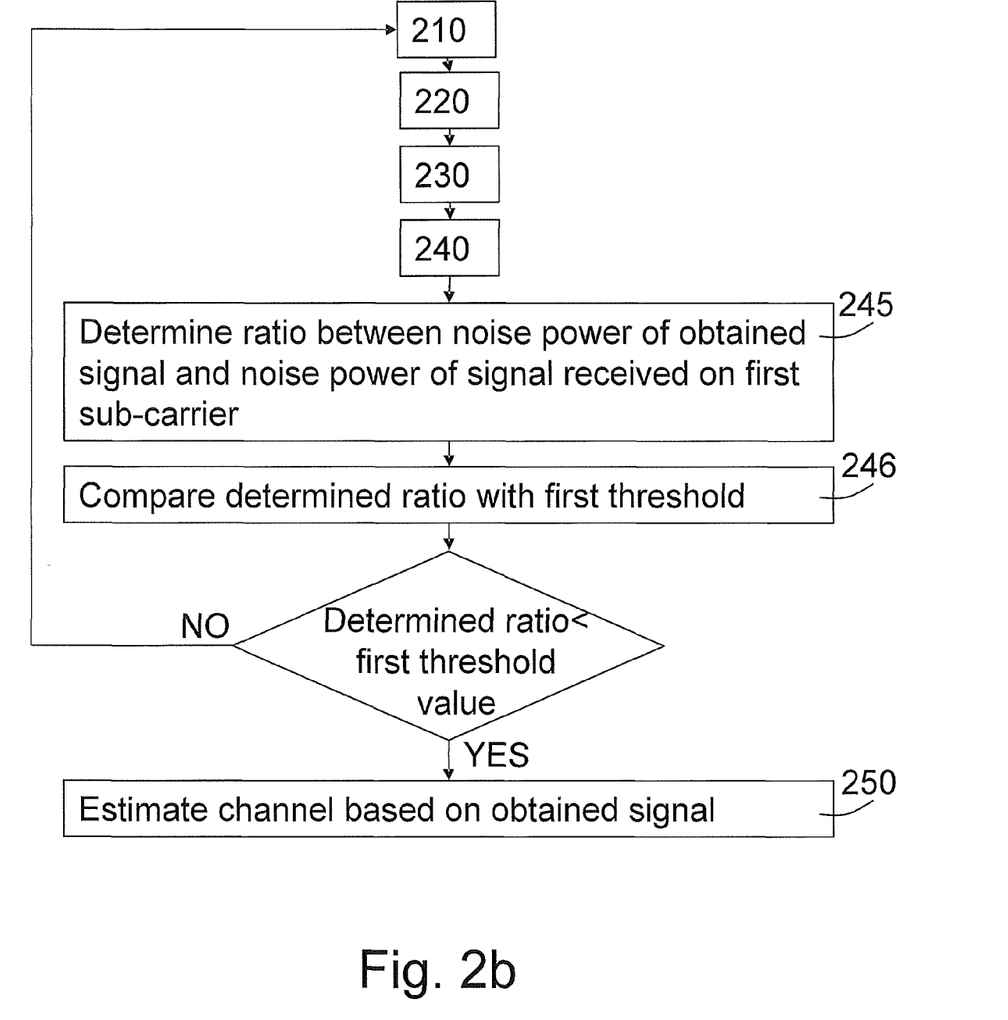

FIG. 2b is a flowchart illustrating the method in the receiving node according to the second embodiment. The method comprises in addition to steps 210-250 described above with reference to FIG. 2a the following steps:

245: Determine a ratio between a noise power of the obtained signal and a noise power of the signal received on the first sub-carrier.

246: Compare the determined ratio with a first threshold value, $P_{thres}$.

250: Estimate the channel based on the obtained signal when the determined ratio is smaller than the first threshold value $P_{thres}$.

Although the steps 245 and 246 are illustrated in the flowchart as being performed after steps 210-240, they may in embodiments alternatively be performed before or in parallel with steps 210-240.

In situations when the inter-cell interference power is limited for a signal received over the channel, and is smaller than the noise power of the signal, it may not be needed to suppress the interference to achieve a good channel estimation. Therefore, in an alternative embodiment to the second embodiment, the method comprises determining an average interference to noise power ratio for a signal received over the channel, and comparing the determined average interference to noise power ratio with a second threshold value. The step 250 of estimating the channel based on the obtained signal will in this embodiment be performed when the determined average interference to noise power ratio is larger than the second threshold value. Typically the second threshold value may be larger than 1, in order to perform the channel estimation on the interference suppressed signal only when the interference power exceeds the noise power. However, the second threshold value may also be adapted dependent on e.g. channel type, and may in some cases therefore be set to a value which is lower than 1.

Figure 3A:
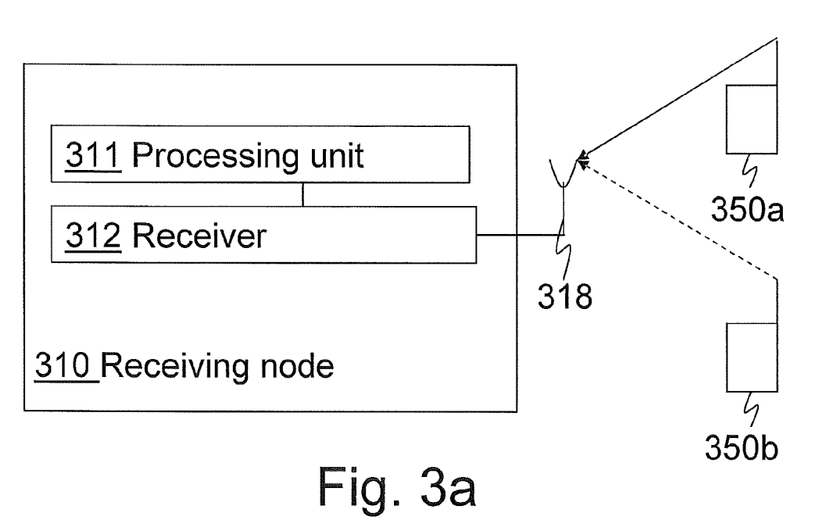
FIGS. 3a-3b are block diagrams illustrating the receiving node according to embodiments.

A receiving node 310 for use in a communications system applying frequency division multiplexing, configured to estimate a channel between the receiving node and a first transmitting node, is schematically illustrated in the block diagram in FIG. 3a according to embodiments. The receiving node may be a base station such as an eNodeB, a relay node, or a user equipment. A first and a second transmitting node 350a, 350b, are also illustrated in the block diagram. The first and second transmitting nodes may both be user equipments, base stations, or relay nodes respectively. The receiving node comprises a processing unit 311, and a receiver 312. In FIG. 3a, the receiver 312 is connected to an antenna 318 via an antenna port. However, there may be more than one antenna and/or antenna ports. The processing unit is configured to determine a first and a second sub-carrier associated with the channel, and the receiver is configured to receive a signal on the first sub-carrier. The processing unit is further configured to multiply the received signal on the first sub-carrier with a first number to form a first resulting signal, wherein the first number multiplied with the known signal transmitted by the second transmitting node on the first sub-carrier equals to a constant value. The receiver is further configured to receive a signal on the second sub-carrier, and the processing unit is further configured to multiply the received signal on the second sub-carrier with a second number to form a second resulting signal, wherein the second number multiplied with the known signal transmitted by the second transmitting node on the second sub-carrier equals to the constant value. The processing unit is further configured to subtract the second resulting signal from the first resulting signal to obtain a signal for which interference from the second transmitting node is suppressed, and to estimate the channel based on the obtained signal.

The known signal may be a reference signal, or a pilot signal. In the first embodiment, the first number is an inverse of the known signal transmitted by the second transmitting node on the first sub-carrier, and the second number is an inverse of the known signal transmitted by the second transmitting node on the second sub-carrier. The channel is in one embodiment assumed to be constant over the first and second sub-carriers. In another embodiment, the channel is interfered by the second transmitting node on the first and second sub-carriers. Sub-carriers that are not interfered are then not taken into account in the interference suppression.

In the second embodiment described above with reference to FIG. 2b, the processing unit 311 is further configured to determine a ratio between a noise power of the obtained signal and a noise power of the signal received on the first sub-carrier, and to compare the determined ratio with a first threshold value. The processing unit is also configured to estimate the channel based on the obtained signal when the determined ratio is smaller than the first threshold value.

In an alternative embodiment, the processing unit 311 is further configured to determine an average interference to noise power ratio for a signal received over the channel, compare the determined average interference to noise power ratio with a second threshold value, and estimate the channel based on the obtained signal when the determined average interference to noise power ratio is larger than the second threshold value.

The units described above with reference to FIG. 3a may be logical units, separate physical units or a combination of both logical and physical units.

Figure 3B:
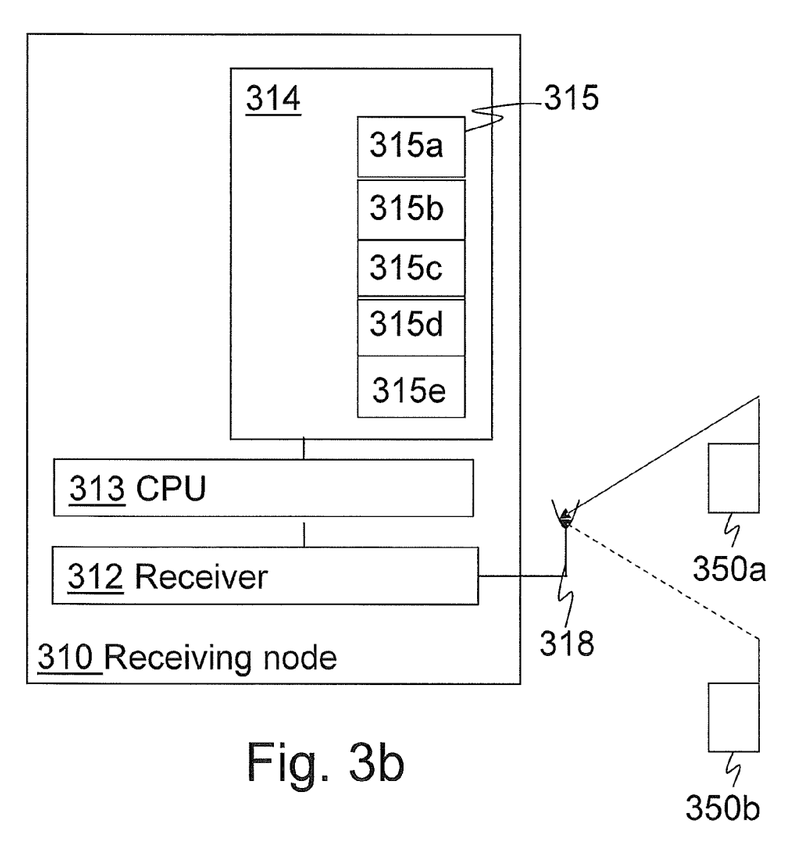

FIG. 3b schematically illustrates an embodiment of the receiving node 310, which is an alternative way of disclosing the embodiment illustrated in FIG. 3a. The receiving node 310 comprises a receiver 312 connected to an antenna 318 via an antenna port, as already described above with reference to FIG. 3a. The receiving node 310 also comprises a Central Processing Unit (CPU) 313 which may be a single unit or a plurality of units. Furthermore, the receiving node 310 comprises at least one computer program product 314 in the form of a non-volatile memory, e.g. an EEPROM (Electrically Erasable Programmable Read-Only Memory), a flash memory or a disk drive. The computer program product 314 comprises a computer program 315, which comprises code means which when run on the receiving node 310 causes the CPU 313 on the receiving node 310 to perform steps of the procedure described earlier in conjunction with FIG. 2a.

Hence in the embodiment described, the code means in the computer program 314 of the receiving node 310 comprises a module 315a for determining a first and second sub-carrier, a module 315b for multiplying a signal received on the first sub-carrier with a first number to form a first resulting signal, a module 315c for multiplying a signal received on the second sub-carrier with a second number to form a second resulting signal, a module 315d for subtracting the second resulting signal from the first resulting signal to obtain a signal for which an interference from the second transmitting node is suppressed, and a module 315e for estimating the channel based on the obtained signal. The code means may thus be implemented as computer program code structured in computer program modules. The modules 315a-e essentially perform the steps 210-250 of the flow in FIG. 2a to emulate the receiving node described in FIG. 3a. In other words, when the modules 315a-e are run on the CPU 313, they correspond to the processing unit 311 of FIG. 3a.

Although the code means in the embodiment disclosed above in conjunction with FIG. 3b is implemented as computer program modules, it may in alternative embodiments be implemented at least partly as hardware circuits.

The above mentioned and described embodiments are only given as examples and should not be limiting. Other solutions, uses, objectives, and functions within the scope of the accompanying patent claims may be possible.

The invention claimed is:

1. A method for use in a receiving node of a communications system applying frequency division multiplexing, for estimating a channel between the receiving node and a first transmitting node, the method comprising:
   determining a first and a second sub-carrier associated with the channel;
   multiplying a signal received on the first sub-carrier with an inverse of a known signal transmitted by a second transmitting node on the first sub-carrier to form a first resulting signal;
   multiplying a signal received on the second sub-carrier with the inverse of the known signal transmitted by the second transmitting node on the second sub-carrier to form a second resulting signal;
   subtracting the second resulting signal from the first resulting signal to obtain a signal for which an interference from the second transmitting node is suppressed; and
   estimating the channel based on the obtained signal.

2. The method of claim 1, further comprising:
   determining a ratio between a noise power of the obtained signal and a noise power of the signal received on the first sub-carrier;
   comparing the determined ratio with a first threshold value; and
   estimating the channel based on the obtained signal when the determined ratio is smaller than the first threshold value.

3. The method of claim 1, further comprising:
   determining an average interference to noise power ratio for a signal received over the channel;
   comparing the determined average interference to noise power ratio with a second threshold value; and
   estimating the channel based on the obtained signal when the determined average interference to noise power ratio is larger than the second threshold value.

4. The method of claim 1, wherein the known signal is a reference signal or a pilot signal.

5. The method of claim 1, wherein the channel is assumed to be constant over the first and second sub-carriers.

6. The method of claim 1, wherein the channel is interfered by the second transmitting node on the first and second sub-carriers.

7. The method of claim 1, wherein the receiving node is a base station, a relay node, or a user equipment.

8. The method of claim 1, wherein the first and second transmitting nodes are user equipments, base stations, or relay nodes.

9. A receiving node for use in a communications system applying frequency division multiplexing, the receiving node configured to estimate a channel between the receiving node and a first transmitting node, the receiving node comprising:
   a processing unit;
   a receiver;
   the processing unit is configured to determine a first and a second subcarrier associated with the channel;
   the receiver is configured to receive a signal on the first sub-carrier;
   the processing unit is further configured to multiply the received signal on the first sub-carrier with an inverse of a known signal transmitted by a second transmitting node on the first sub-carrier to form a first resulting signal;
   the receiver is further configured to receive a signal on the second subcarrier;
   the processing unit is further configured to multiply the received signal on the second sub-carrier with the inverse of the known signal transmitted by the second transmitting node on the second sub-carrier to form a second resulting signal;
   the processing unit is further configured to subtract the second resulting signal from the first resulting signal to obtain a signal for which an interference from the second transmitting node is suppressed; and
   the processing unit is further configured to estimate the channel based on the obtained signal.

10. The receiving node of claim 9, wherein the processing unit is further configured to:
    determine a ratio between a noise power of the obtained signal and a noise power of the signal received on the first sub-carrier;

compare the determined ratio with a first threshold value; and estimate the channel based on the obtained signal when the determined ratio is smaller than the first threshold value.

11. The receiving node of claim 9, wherein the processing unit is further configured to:

determine an average interference to noise power ratio for a signal received over the channel;

compare the determined average interference to noise power ratio with a second threshold value; and estimate the channel based on the obtained signal when the determined average interference to noise power ratio is larger than the second threshold value.

12. The receiving node of claim 9, wherein the known signal is a reference signal or a pilot signal.

13. The receiving node of claim 9, wherein the channel is assumed to be constant over the first and second sub-carriers.

14. The receiving node of claim 9, wherein the channel is interfered by the second transmitting node on the first and second sub-carriers.

15. The receiving node of claim 9, wherein the receiving node is a base station, a relay node, or a user equipment.

16. The receiving node of claim 9, wherein the first and second transmitting nodes are user equipments, base stations, or relay nodes.

* * * * *